United States Patent [19]

Smith et al.

[11] Patent Number: 5,403,605
[45] Date of Patent: Apr. 4, 1995

[54] COFFEE BREWING METHOD

[75] Inventors: Robert F. Smith, Ridgefield Park, N.J.; James P. Herrick, Brookfield, Conn.; Timothy J. Strelevitz, White Plains, N.Y.

[73] Assignee: Kraft General Foods, Inc., Northfield, Ill.

[21] Appl. No.: 112,708

[22] Filed: Aug. 26, 1993

Related U.S. Application Data

[63] Continuation of Ser. No. 606,041, Oct. 30, 1990, abandoned.

[51] Int. Cl.⁶ .............................................. A23F 5/26
[52] U.S. Cl. ..................................................... 426/433
[58] Field of Search ............................................. 426/433

[56] References Cited

U.S. PATENT DOCUMENTS

| | | |
|---|---|---|
| 3,620,758 | 11/1971 | Friedman et al. |
| 4,389,924 | 6/1983 | Hoesselbarth ............... 99/289 R |
| 4,581,239 | 4/1986 | Woolman et al. ............ 426/433 |
| 4,583,449 | 4/1986 | Dangel et al. .................. 99/279 |
| 4,707,368 | 11/1987 | Vogel et al. ................... 426/386 |

FOREIGN PATENT DOCUMENTS

| | | |
|---|---|---|
| 55-068254 | 5/1980 | Japan . |
| 2205229 | 12/1988 | United Kingdom . |
| 688175 | 9/1979 | U.S.S.R. . |
| 1637740 | 3/1991 | U.S.S.R. . |

OTHER PUBLICATIONS

Sivetz and Desrosier, Coffee Technology, The AVI Publishing Company, Inc., 1979, pp. 334–335.
Sivetz and Derosier, Coffee Technology, The AVI Publishing Company, Inc., 1979, pp. 324–325.

*Primary Examiner*—Joseph Golian
*Attorney, Agent, or Firm*—Thomas R. Savoie; Thomas A. Marcoux

[57] ABSTRACT

Coffee brewing cycle time is improved by contacting roasted ground coffee with a brief interval of steam, e.g. 3 seconds. The steam is preferably introduced prior to contact with brewing water and may be followed by a brief interval of pause prior to introducing the water. Steam and water are preferably introduced under a moderately elevated pressure. Improvements in appearance, color, flavor, aroma and yield can be achieved along with reduced cycle time.

1 Claim, 1 Drawing Sheet

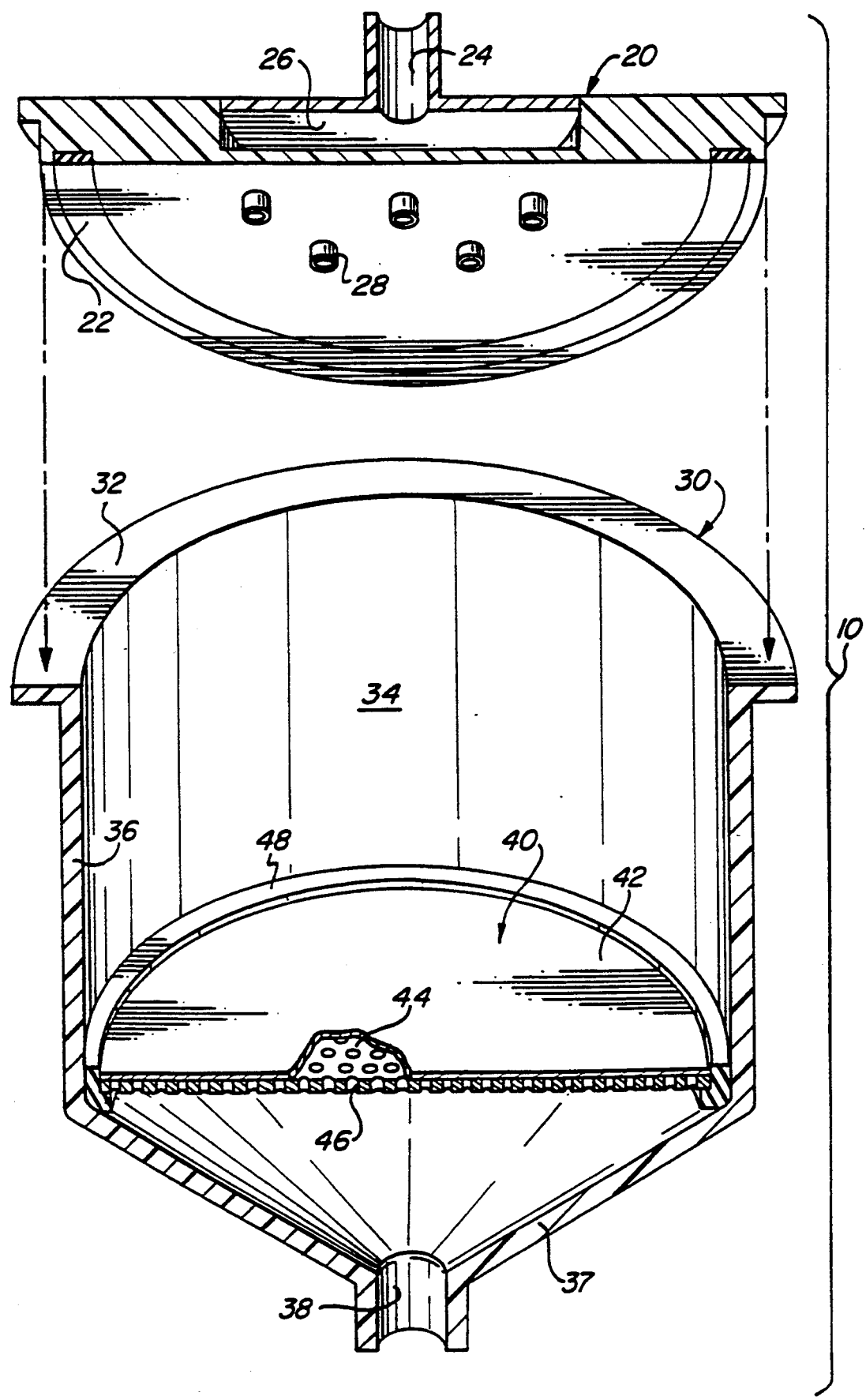

COFFEE BREWING METHOD

This is a continuation of application Ser. No. 07/606,041, filed on Oct. 30, 1990, now abandoned.

TECHNICAL FIELD

The invention relates to the preparation of coffee beverages in brewers suitable for home, vending and institutional use, and particularly to a method which enhances coffee quality in a short brew cycle.

Coffee brewers are relied upon to quickly provide brewed coffee in cup, pot and urn quantities of high quality in short periods of time. The consumer prefers coffee having a good balance of appearance, flavor and aroma. Unfortunately, the provision of all of these is not fully consistent with rapid brewing times. The use of moderate pressures, fineness of grind or elevated water temperatures, to speed brewing have not to date enabled the high quality expected and achievable by simply dripping hot water through roasted and ground coffee held in a paper filter.

There is a present need for a process which would permit achieving the expected high quality coffee beverage in decreased brewing time.

BACKGROUND ART

Many attempts have been made to improve brewing cycle times and efficiencies and or to increase extraction rates. However, the art has not recognized the simple solution offered by the invention of contacting the roasted and ground coffee with steam for a short time period followed by extraction with water.

U.S. Pat. No. 4,389,924 to Hoesselbarth shows an automatic coffee maker which has a brewing unit which slides internally between brewing and rest positions. In the brewing position, brewing is accelerated by the use of a plunger which applies pressure directly to the brewing mixture to force it through a strainer. It would, however, be desirable to have a coffee making process which actually enhanced coffee flavor and aroma while increasing its rate of production.

In U.S. Pat. No. 4,583,449 to Dangel et al, there is disclosed a coffee maker which again makes coffee under pressure to speed brewing. To improve quality and simplify coffee maker construction, a through-flow heater is employed to carefully control water temperature and prevent it from being delivered to the roasted and ground coffee in a superheated state. The Dangel et al arrangement is intended to eliminate the need for a prior art water metering chamber which required preheating with steam. Thus, although prior art coffee brewers had steam capability and decreased brew cycle time by the use of pressure, it was not recognized that brief application of steam to the ground coffee could improve the quality of the brewed coffee.

In the preparation of high-solids-concentration extracts for spray drying to prepare dried "instant" coffee, steam treatment of roasted and ground coffee has been practiced to extract aromas. For example, in U.S. Pat. No. 4,707,368, Vogel et al use low-pressure, low-temperature steam for at least 15 minutes to extract aromatics which are later combined with the water extract for drying. There is no recognition that a short interval of steaming, without the preparation of a separate steam extract, would in any way enhance the quality of coffee brewed in typical pot or cup quantities for serving.

It is also known in industrial percolators for preparation of high solids extracts, to prewet the roasted and ground coffee prior to water extraction. This is noted by Sivetz and Desrosier, in *Coffee Technology*, The AVI Publishing Company, Inc., (1979) at pages 334–335. The authors also note at page 335 that, when beaker quantities of roast and ground coffee are added to boiling water, it takes about five minutes of boiling to wet the coffee particles. This time is not permissible for a modern home, office, restaurant or vending machine coffee brewer.

DISCLOSURE OF INVENTION

It is an object of the invention to provide a process for rapidly brewing coffee for home, vending and institutional use which is of high quality in terms of having a good balance of appearance, flavor and aroma.

It is another object of the invention to provide a process for rapidly brewing coffee of good quality and with high yield.

These and other objects are accomplished according to the invention which provides, in a process for brewing coffee of the type where hot water is contacted with roasted and ground coffee in a brewing chamber and the resulting aqueous brew suspension is filtered prior to collection in a serving container, the improvement comprising: contacting the roasted and ground coffee in sequence with an interval of steam and later with hot water.

The brewing, including contact with steam and water, is desirably conducted under a moderately elevated pressure. The contact interval with steam may be followed by a pause interval, typically equivalent in duration to the steam interval. The steam is preferably applied at the beginning of the brew cycle.

BRIEF DESCRIPTION OF THE DRAWINGS

The present invention will be better understood and its advantages more apparent in view of the following detailed description, especially when read with reference to the accompanying drawing, wherein:

The Figure is a perspective view, partially in section, of a brewing device capable of brewing coffee by the process of this invention.

BEST MODE FOR CARRYING OUT THE INVENTION

The following detailed description is illustrative the purposes of supplying a complete disclosure, but is not intended to limit the invention.

The invention relates to the preparation of coffee beverages in brewers suitable for home, vending and institutional use, and provides a method which enhances coffee beverage quality in a short brew cycle.

Coffee brewers are relied upon to quickly provide brewed coffee of high quality in cup or pot quantities. Brewed coffee having a good balance of appearance (e.g., color), flavor and aroma, made in a rapid brewing time, is provided by the method of this invention. Attention is drawn to the Figure which shows a perspective view, partially in section, of a coffee brewing apparatus shown generally as 10, having a cover assembly 20, a base member 30, and a filtering assembly 40, including a filter element 42, such as described in greater detail in copending U.S. patent application Ser. No. (Case No. 19609) filed concurrently herewith in the names of Robert F. Smith, James P. Herrick and Mete Bruncaj, the disclosure of which is incorporated herein by reference.

The invention is not restricted to use in this environment, but can be employed in any suitable beverage maker, including both atmospheric and pressure brewing for institutional, home and vending use for quantities as low as single serving portions. Paper or reusable filter elements can be employed. The unique process of the invention, which permits rapid extraction while still providing a good balance of flavor, aroma, appearance and yield, well serves the requirements in all of these environments. The improvements of this invention can be applied to brewing quantities for single cup (e.g., 150 to 200 ml), pot (e.g., 2 to 12 cups) and urn (e.g., 10 to 150 cups).

The Figure shows the cover assembly 20 tipped back from the base member. When in brewing position, seal 22 contacts sealing flange 32 with sufficient force to provide a seal for brewing under moderately elevated pressures, e.g. on the order of from 0.1 to 4 bar. The structural material for the cover assembly 20 and the base member 30 is shown as plastic and can be any heat stable plastic, including thermosetting resins such as phenol formaldehyde, epoxy, polycarbonate, and, preferably, polysulfone.

When the base member is open, roasted and ground coffee is deposited within a brewing chamber 34 defined by the side wall 36 of the brewing chamber, the filtration element 42 and the lower surfaces of the cover assembly 20. The coffee will preferably be of a grind with an average particle size within the range of from 300 to 850 microns, most typically from 400 to 800 microns. The coffee will be employed in amounts as desired for strength. Typically, amounts of from 15 to 65 grams, and preferably 17 to 50 grams, per 1000 grams of brewing water, more preferably from 25 to 30. The brewing chamber is preferably configured to provide coffee bed depth (L) to bed diameter (D) ratios of less than 6, more narrowly less than 1, typically 0.05 to 0.5. Preferred L/D ratios will be from 0.2 to 0.3.

To brew the coffee, the seal 22 is preferably brought into sealing engagement with flange 32. It will be recognized by those skilled in the art that the chamber 34 can be any suitable vessel and need not be pressurized. Also, the ground coffee need not be maintained in a static bed during contact where other means are provided for effecting contact with steam and water under conditions effective to meet the objectives of the invention.

The invention provides the improvement comprising contacting the roast and ground coffee in sequence with an interval of steam followed by contact with hot water. Preferably, both the steam and hot water are supplied to the brewing chamber under a moderate superatmospheric pressure (e.g., up to 4 bar, typically 0.1 to 2 bar) through feed line 24 to header 26 and distribution jets 28. The orientation and placement of the jets can be varied as necessary for specific brewer geometrics. A suitable sparger can be employed. The steam is preferably saturated steam at the indicated pressure and at a temperature of from 212° to 300° F.

The brewing water will preferably have a temperature within the range of from 175° to 212° F., typically about 180° to 210° F. For brewing pot quantities of coffee, brewing times, i.e. the time interval during which water and/or steam is supplied, will typically be under 250 seconds, with preferred brewing times between 90 and 180 seconds, e.g. about 100 to 150. For cup quantities, brewing times can be as short as from 5 to 30 seconds; and for urn quantities they can be extended to as long as 4 to 20 minutes.

Improvements in brewed coffee appearance, flavor, aroma and yield can be achieved by the improved process of the invention wherein roasted and ground coffee is contacted with a brief interval of steam during brewing. The steam contact is preferably followed by a brief interval of pause, where neither steam nor water are introduced into contact with the coffee. The contact with steam is preferably prior to any contact with water, but this is not an absolute rule.

Desirably, the interval of steam is from 0.5 to 30 seconds. The steam will desirably be delivered in quantities sufficient to provide from 0.1 to 10 grams of water per gram of roasted and ground coffee and from 0.2 to 25 BTU's (211 to 26,375 Joules) per gram of roasted and ground coffee. More typical levels will be from 0.7 to 2 grams of water and from 1.5 to 5 BTU's per gram of roasted and ground coffee. For brewing in urns, longer steam intervals may be required and can be from 2 to 10 times longer, e.g. 2 to 5. Longer times may be employed, but the advantage of a more rapid brew cycle will then be reduced. More typically, both intervals of steam and pause are less than 15 seconds combined duration. It is sometimes convenient to provide equivalent intervals of steam and pause, and to conduct both within a combined time of from 2 to 12 seconds. Preferred intervals for each of the steam and pause cycles fall within the range of from 1 to 10 seconds for a one-pot quantity.

During brewing, the moderate pressure within the brewing chamber 34 forces brewed beverage out of the chamber 34 through filter element 42 and the entire filter assembly 40 to collection chamber below which is defined by bottom wall 37 which is pitched toward outlet 38 which delivers the beverage to a suitable collection vessel such as a cup or coffee pot (not shown).

The filter assembly 40, in addition to filter element 42, includes foraminous support sheet 44, preferably of stainless steel, which offers strength to support filter element 42, and rubber seal 48.

The holes in the illustrated filter element 42 are microscopic (e.g. 12 to 60 microns), and looking at the screen placed against a dark background gives the appearance of a solid metal foil. When placed over a light source, however, light will be transmitted through the holes in the filter element which when viewed from the top (first surface) will have an open space of from 5 to 25%. Details of filters of this type can be found in the above-referenced copending patent application, or commercially-available paper or reusable filter elements can be employed. The following Example is provided to further illustrate and explain a preferred form of the invention and is not to be taken as limiting in any regard. Unless otherwise indicated, all parts and percentages are by weight.

EXAMPLE

Several pots of coffee were brewed and compared to evaluate the effect of the new process on brewed coffee.

Run number 1 was a conventional drip brew wherein hot water was poured over roasted and ground coffee, a process recognized for producing a high quality brewed coffee beverage.

The other runs were all conducted by delivering water at elevated pressure to a closed brewing chamber. The weight of coffee and the grind size employed for Runs 2 and 3 were selected to produce comparable cup solids to Run 1. Run 4 used the same weight and grind of coffee employed in Runs 2 and 3, but brewing conditions were modified to provide better extraction.

The brewing conditions and results are set forth below:

|  | Run | | | |
| --- | --- | --- | --- | --- |
|  | 1 | 2 | 3 | 4 |
| Wt. Coffee (g) | 57 | 51 | 51 | 51 |
| Grind (ave. micron) | 780 | 600 | 600 | 600 |
| Pressure (bar gage) | 0 | 0.8 | 0.8 | 0.8 |
| Brew Time (sec.) | 240 | 140 | 140 | 140 |
| Steam (sec.) | 0 | 0 | 3 | 5 |
| Pause (sec.) | — | — | 3 | 5 |
| Yield (%)[1] | 21 | 24 | 25 | 29 |
| Transmittance (%)[2] | 49 | 45 | 40 | 38 |
| L/D | 0.22 | 0.20 | 0.20 | 0.20 |
| Brewed Coffee (ml) | 1650 | 1600 | 1600 | 1600 |
| Flavor | Balanced mod. acidity | Flat, low level top notes | Close to (1) | Enhanced aroma/ flavor intensity |

[1] Yield is the percentage of coffee solids added which are recovered in solution. This density-based yield determines solids by an Anton Parr Calculating Digital Density Meter-Model DMA-46. A 2 cc sample is measured at 25° C. and the value read when stabilized.
[2] Bausch & Lomb Spectronic 20 using light at a wavelength of 640 nanometers and a Pyrex spectrophotometer cuvette (#9800).

The results demonstrate that when coffee is brewed with pressure, grind and coffee weight sufficient to produce about the same cup solids (Run 2) but without using the improvement of the invention, the flavor of the coffee was flat with a low level of top notes as compared to Run 1. When the invention was employed with a moderate steam treatment (Run 3), the brewed beverage compared well to Run 1. And, when the invention was employed to provide a moderate but longer treatment according to the invention, flavor, aroma and yield were all enhanced (Run 4).

The above description is for the purpose of enabling the person skilled in the art to make and use the invention and is not intended to describe each and every modification and variation of it which will be obvious to the skilled worker upon reading. All such modifications and variations are intended, however, to be included within the scope of the invention which is defined by the following claims.

We claim:

1. A process for brewing coffee beverage comprising:
   (a) closing a chamber around a bed of roasted and ground coffee having an average particle size of from 400 to 800 microns and being sufficient to brew from 2 to 12 cups of coffee, the ratio of the bed depth to bed diameter being less than 1;
   (b) supplying saturated steam into the chamber at an elevated pressure of from 0.1 to 2 bar for an interval of sufficient duration to supply from 0.7 to 2 grams of water per gram of roasted and ground coffee and from 1.5 to 5 BTU's per gram of roasted and ground coffee;
   (c) then, stopping contact with steam for a pause interval of at least 1 second prior to contact with brewing water, wherein the intervals of steam and of pause are less than 15 seconds in combined duration; and
   (d) then, contacting the coffee with hot brewing water supplied at moderately elevated pressure to form a brew suspension and filtering the brew suspension to recover a brewed coffee beverage having good appearance, flavor and aroma, comparable in quality to drip coffee;
   wherein the total time interval during which the water and steam are applied is within the range of from 90 to 250 seconds.

* * * * *